July 5, 1960  C. A. HANSEN  2,943,883
LIFTING FORK FOR ROAST MEAT
Filed April 13, 1959  2 Sheets-Sheet 1
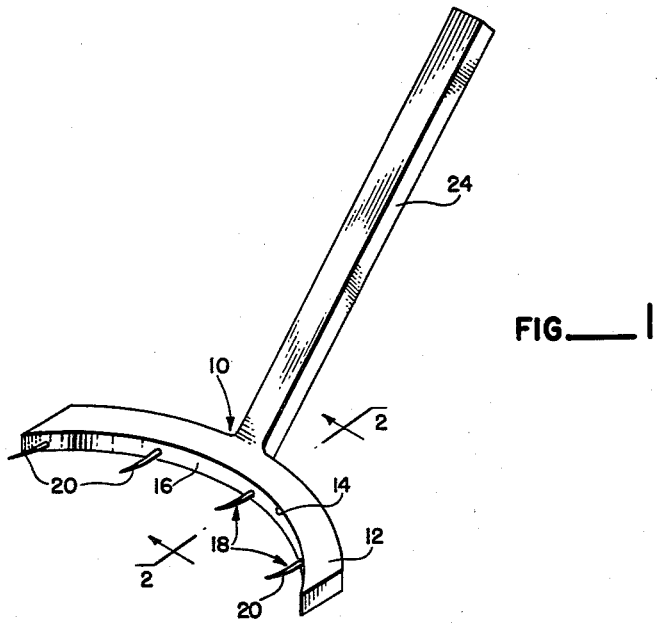
FIG.—1
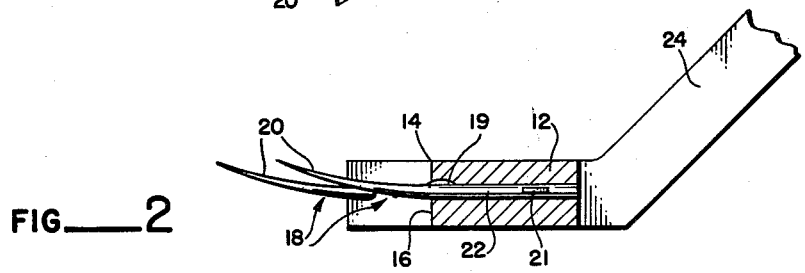
FIG.—2
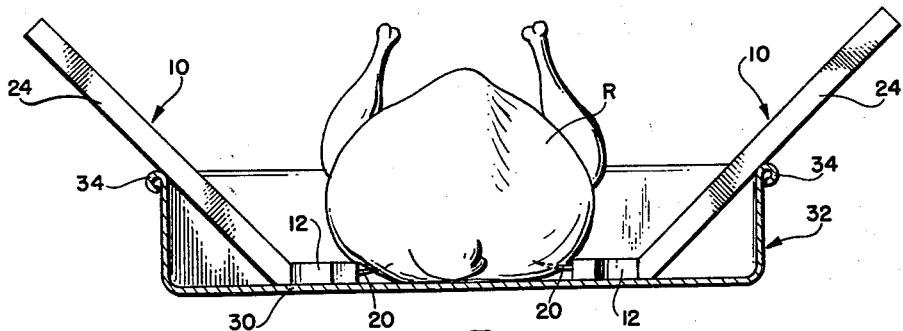
FIG.—3
INVENTOR.
CONRAD A. HANSEN
BY
Smith + Tuck July 5, 1960  C. A. HANSEN  2,943,883
LIFTING FORK FOR ROAST MEAT
Filed April 13, 1959  2 Sheets-Sheet 2

INVENTOR.
CONRAD A. HANSEN
BY
*Smith & Tuck*

United States Patent Office 2,943,883
Patented July 5, 1960

2,943,883

LIFTING FORK FOR ROAST MEAT

Conrad A. Hansen, 915 13th Ave., Seattle, Wash.

Filed Apr. 13, 1959, Ser. No. 805,853

4 Claims. (Cl. 294—49)

This present invention relates to the general art of culinary utensils and more particularly to fork-like devices used in coacting parts for the handling of hot roasts and especially for lifting roasts out of the pans in which they have been cooked.

There are many items of food, which lend themselves particularly to roasting and which when cooked pose quite a problem in lifting them out of the pan in which they have been roasted. The handling problem is complicated due to the fact that the pan itself is very hot and normally either the roated food is meat, which exudes a good deal of grease or grease has been applied to the cooking food during the roasting operation. Such roasted food products may be fowl or different kinds of roast meats or some of the larger vegetables such as squash. All of these products are difficult to handle safely because of their weight and bulk. Fish are also often difficult to remove from the pan because ordinary handling utensils, as forks etc., do not support the fish over enough of its length so that it may be lifted without danger of breaking it into several parts. My present lifting devices provide both a safe and a convenient way of lifting a roast from its cooking pan without mutilating the same in any observable manner or causing it to break into small parts, which destroys the form, in case of a fish, or disfiguring a fowl that is well cooked so that they lose their luscious, edible appearance.

A principal object of this present invention therefore is to provide fork-like lifting devices which make it possible to conveniently and safely lift roast food from the pan in which it has been cooked.

A further object of this invention is to provide lifting means, which engages a roast near the cooking surface of the pan so that when it is served any tine marks that may have been made in the roast will be in that portion normally hidden from view.

A further object of this invention is to provide fork-like lifting devices in which the lifting tines are disposed angularly with respect to the handles so that the devices can engage the roast adjacent the pan bottom and then the devices can be operated as levers to initially lift the roast from contact with the pan even though it may be somewhat burned or stuck to it.

A further object of this invention is to provide fork-like lifting devices in which a plurality of tines are disposed along a header portion of the fork so that the tines will be well spaced apart and thus provide maximum lifting power with minimum mutilation of the roast.

A further object of this invention is to provide fork-like lifting devices in which the header supporting the spaced apart tines is arcuate in form so that it presents a curved surface for abutting the roast and thus tends to press the roast into compact form at the point where the tines engage it.

Further objects, advantages and capabilities will be apparent from the description and disclosure in the drawings, or may be comprehended or are inherent in the device.

In the drawings:

Figure 1 is a perspective view showing one of my fork-like lifting devices.

Figure 2 is a vertical sectional view with the handle portion broken away in part and particularly illustrating the angularity between the tines and the handle and between the handle and the header portion of the fork in which the tines are seated, taken along line 2—2 of Figure 1.

Figure 3 is a cross-sectional view illustrating two of my lifting forks as they coact to engage a roast fowl in the roasting pan.

Figure 4:
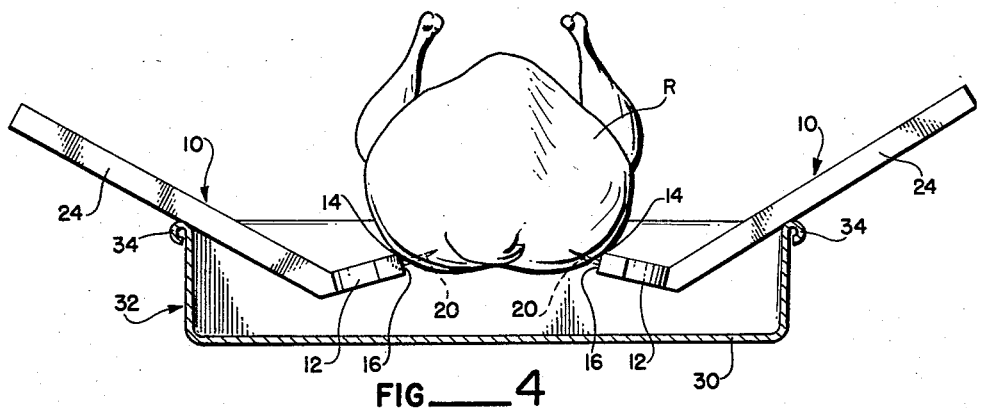
Figure 4 is a view in section similar to Figure 3 but showing the manner in which the forks are employed as levers to break the roast loose from the pan and to assist in the initial raising of the same.

Referring to the drawings, throughout which like reference characters indicate like parts, the numeral 10 designates generally one of my lifting forks. The fork is provided with a header portion 12 having preferably a rectangular cross section so that when needed a relatively sharp corner will be provided at 14. In order to function as a lifting lever end for use in pans, the header 12 should be relatively long and narrow with the length being four times or more greater than the width of the header. Further, on food products that need to be held in some compression while being lifted, it is desirable that a longitudinal arcuate surface as 16 be provided as experience has indicated that most roasts will be most closely fitted by such a form. Extending outwardly from the substantially vertically disposed surface 16 is a plurality of lifting tines 18. These tines are preferably provided with up-turned pointed ends 20 and with a relatively long bearing portion 22, which is best deformed to a degree as at 19 and 21 to resist turning to the end that the points will always be retained with the curve substantially as illustrated throughout the various views of the drawings. These tines are preferably made of stainless steel so that they will not corrode. This construction insures that there will be no contamination of the food with which the lifting devices are used and the points will retain their sharpness over long periods.

Fixedly secured to header portion 12 at its longitudinal center is the lifting handle 24. This handle is preferably formed with a rectangular or at least oval cross section so there will be little tendency for the fork to turn in the user's hand, when a roast of substantial weight is being lifted. It is very desirable to have handle 24 engage header 12 with a pronounced angle with the plane of the header normally somewhere between 45° and 60°. throughout the various drawings, the handle is shown at approximately 45° which is believed to be about the minimum angle. For use with heavy roasts, the angle with the horizontal or plane of the arcuate header may be increased to 60° which brings the handles closer to a vertical position and thus makes it easier in many instances to get the header and the tines in the most desirable position inside the roasting pan. The handle and header portion of my fork may be made of any suitable material. In the less expensive types certain of the plastic materials are probably the best choice, as the entire device can be molded in one operation and any configuration of the tines along portion 22 can be permanently secured within the plastic material during the molding operation. In the more expensive renderings of this fork arrangement, the handle may be fabricated of wood in which case the header and handle portion are normally made separately and then suitably joined together with probably metal reinforcements.

Figure 5:
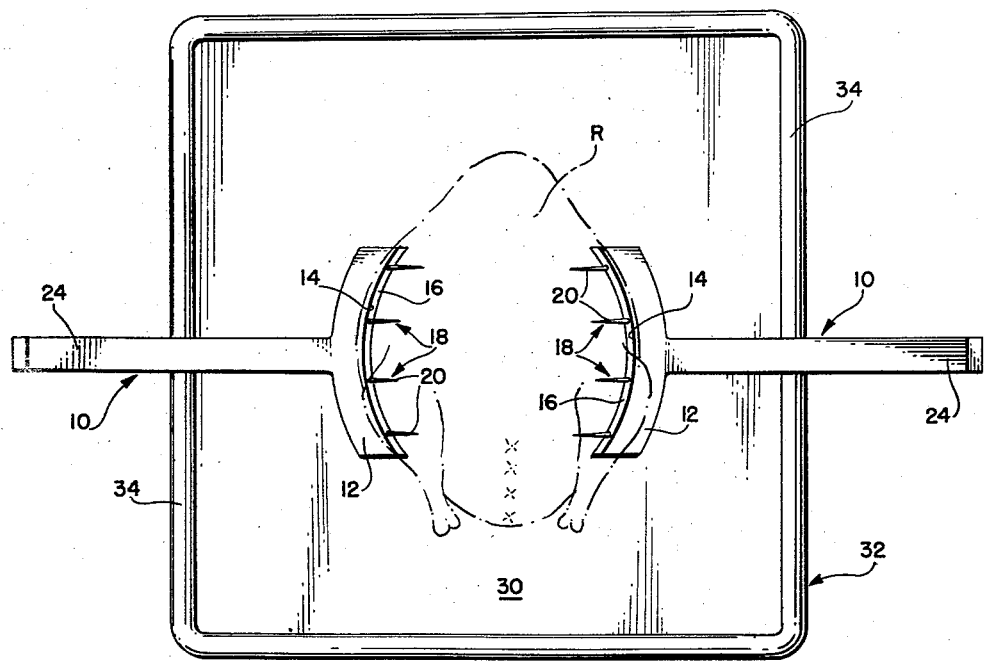
Figure 5 is a top plan view with a roast fowl shown in dashed lines so as to illustrate the manner in which my lifting forks and their tines engage a roast.

The manner of using my lifting forks is believed to be well illustrated in Figure 3, 4 and 5. It is to be understood that my lifting forks are used in cooperative pairs, one in each hand of the user. The forks are first placed as in Figure 3 with the header portion preferably resting on the bottom 30 of pan 32 and with the handles coming to rest upon the beaded upper edge 34 of the pan. Normally a slight upward tilt may be given each of the handles from the position shown in Figure 3 so that the curved portion of the tine points can be engaged as low as possible in the roast. Then the two forks are brought toward the roast at the same time so that the tines are fully seated and either the arcuate surfaces 16 fully engage the roast or at least the upper corners 14 of the same are engaging the roast along a contact line. The engagement of the header with the roast is very desirable in that it prevents the tines from tearing their way through any well done tender meat particularly if the roast is stuck to the bottom of the pan as so often occurs in a roasting operation.

If any difficulty is experienced in initially breaking the roast loose from the pan, the operation as illustrated in Figure 4 should be undertaken in which each of the fork handles 24 is used as a lever over the beaded margins 34 of the pan. This lifts the roast while at the same time the pan is definitely pressed downwardly as the beads 34 on opposite sides of the pan 32 form fulcrums for the lever action. When the roast is raised to the approximate position as illustrated in Figure 4, it should then be apparent that it should be easily possible to lift the roast and set it over onto a platter or carving surface.

Figure 5 illustrates a preferred manner of engaging a roast, in this instance a fowl, where it will be noted that the roast R overlies the edges 14 of the arcuate headers and in this way greatly enlarges the supporting area employed in lifting the roast.

If, on the other hand, the roast is a fish for instance, compression is needed to hold it intact and this is achieved by pressing the two forks toward each other at the same time so that the surfaces 16 compress the meat in these extended areas and the areas in which the tines pierce the meat so that the lifting operation can be achieved without breaking up the form of a well done fish for instance. In the case of a fish, it has been found desirable to employ the arcuate form rather than a more straight form because if the large mass of the fish can be slightly compressed as it is impaled by the tines the bone structure of the fish will be well supported and this in turn makes it possible to lift the entire fish without breakage. Under such conditions, it is normal for the fish to overlie the arcuate header members and thus a lifting effect is obtained very similar to that possible by a person taking their two hands and with the palm of the hands towards each other and vertically disposed bringing them toward each other in order to compress and raise a soft body, a good illustration being bread or biscuit dough. It has been found that with my devices and a little experience on the part of the operator that almost any roast meat or roast vegetables can be easily picked up without in any way mutilating the same and it can be lifted out of hot grease filled pans without any danger of the roast material slipping or getting out of control and possibly splashing in the grease in the bottom of the pan.

It is believed that it will be clearly apparent from the above description and the disclosure in the drawings that the invention comprehends a novel construction of a lifting fork for roast meat.

Having thus disclosed the invention, I claim:

1. Lifting forks for roast meat, fish and the like adapted for use in coacting pairs, comprising: a header portion for each of said forks having a substantially rectangular cross section and an elongated shape with a length in excess of four times the width of the cross section; said header having a vertical engaging surface of longitudinal arcuate, concave shape and substantially parallel top and bottom faces; the bottom face providing a guiding and positioning surface for the fork when in use and the top face providing a sharp corner at its juncture with the vertical engaging surface; a plurality of lifting tines secured in said header portion and extending outwardly from and substantially normal to said vertical surface; and a handle for said fork secured at substantially the back longitudinal center of said header portion and sloping upwardly at an angle of 45° to 60° with the horizontal plane of said header portion to provide prying means for said forks.

2. The subject matter of claim 1 in which said handle has a cross-sectional shape in which the major axis is substantially parallel to the longitudinal axis of said header and the minor axis is at right angles thereto.

3. The subject matter of claim 1 in which said handle is secured to said header on the longitudinal face opposite said vertical surface.

4. The subject matter of claim 1 in which said tines have deformed portions adapted to be engaged by said header to prevent said tines revolving about their longitudinal axes.

References Cited in the file of this patent

UNITED STATES PATENTS

| | | |
|---|---|---|
| D. 177,643 | Schoenfeld | May 8, 1956 |
| 303,672 | Shannon | Aug. 19, 1884 |
| 992,046 | Paulsen et al. | May 9, 1911 |
| 1,203,339 | Holstein | Oct. 31, 1916 |
| 1,525,810 | Hill et al. | Feb. 10, 1925 |
| 1,761,104 | Cutler | June 3, 1930 |
| 2,180,544 | Nissen | Nov. 21, 1939 |
| 2,707,651 | Ott | May 3, 1955 |
| 2,873,521 | Cortner | Feb. 17, 1959 |